United States Patent
Song et al.

(10) Patent No.: US 10,051,616 B2
(45) Date of Patent: Aug. 14, 2018

(54) MULTIUSER DETECTION FOR HIGH CAPACITY CELLULAR DOWNLINK

(71) Applicants: William S. Song, Lexington, MA (US); Adam R. Margetts, Westford, MA (US)

(72) Inventors: William S. Song, Lexington, MA (US); Adam R. Margetts, Westford, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 715 days.

(21) Appl. No.: 14/508,686

(22) Filed: Oct. 7, 2014

(65) Prior Publication Data

US 2017/0303244 A1    Oct. 19, 2017

(51) Int. Cl.
*H04B 7/26* (2006.01)
*H04L 27/06* (2006.01)
(Continued)

(52) U.S. Cl.
CPC ....... *H04W 72/042* (2013.01); *H04L 25/0224* (2013.01); *H04W 52/346* (2013.01)

(58) Field of Classification Search
CPC ....... H04B 7/005; H04B 1/69; H04W 52/346; H04W 72/042; H04W 52/44; H04W 52/34; H04L 27/06; H04L 1/0071; H04L 1/0006; H04L 25/0224; H04L 25/0204; H04L 27/2601; H04L 1/0067; H04J 13/00
(Continued)

(56) References Cited

U.S. PATENT DOCUMENTS 5,345,598 A * 9/1994 Dent .................. H04W 52/346
                                                  455/127.1
6,700,921 B1   3/2004 Shibuta
(Continued)

OTHER PUBLICATIONS

De Gaudenzi, Riccardo, and Filippo Giannetti, "DS-CDMA Satellite Diversity Reception for Personal Satellite Communication : Downlink Performance Analysis", Proceedings of the AIAA/ESA Workshop on International Cooperation in Satellite Communications, Mar. 27-29, 1995, The Netherlands, pp. 179-184, European Space Agency; 6 pages.
(Continued)

*Primary Examiner* — Edan Orgad
*Assistant Examiner* — Vanneilian Lalchinthang
(74) *Attorney, Agent, or Firm* — Schmeiser, Olsen & Watts LLP

(57) ABSTRACT

A system and method for decoding an intended transmission includes a user device that receives a downlink transmission containing a user signal intended for the user device and one or more interfering user signals directed to one or more other user devices. The user device obtains power stacking information that includes a power level for each of the user signals contained in the received downlink transmission. A channel is estimated using pilot signals in the downlink transmission. Each interfering user signal contained in the downlink transmission is demodulated and decoded using the power stacking information. The user device removes all interfering user signals from the received downlink transmission to obtain the user signal intended for the user device.

37 Claims, 4 Drawing Sheets

(51) Int. Cl.
  *H04W 72/04* (2009.01)
  *H04W 52/34* (2009.01)
  *H04L 25/02* (2006.01)
(58) Field of Classification Search
  USPC .......................................................... 370/320
  See application file for complete search history.

(56) References Cited

U.S. PATENT DOCUMENTS

| | | | |
|---|---|---|---|
| 7,920,537 B2 | 4/2011 | Jones | |
| 8,144,748 B2* | 3/2012 | Yellin | H04B 1/7103 370/335 |
| 2005/0213679 A1 | 9/2005 | Yamagata | |
| 2005/0250506 A1* | 11/2005 | Beale | H04L 5/0037 455/452.1 |
| 2007/0036243 A1* | 2/2007 | D'Amico | H04L 25/0204 375/340 |
| 2009/0060094 A1* | 3/2009 | Jung | H04B 1/69 375/340 |
| 2009/0135800 A1 | 5/2009 | McPherson | |
| 2009/0312042 A1* | 12/2009 | Rudrapatna | H04B 1/126 455/501 |
| 2012/0201279 A1* | 8/2012 | Liberti, Jr. | H04B 1/71055 375/148 |
| 2014/0003470 A1 | 1/2014 | Shen | |
| 2014/0092862 A1 | 4/2014 | Noh et al. | |

OTHER PUBLICATIONS

Schniter, Phil, "Communication, Sensing, and Resource Allocation: Research at Ohio State", Mar. 23, 2010, The Ohio State University; 21 pages.
Ahmed, Ahmed Mohamed Abdelsalam and Ian Marsland, "Co-channel Interference Cancellation in Multihop Relay Networks", ICC 2008 Workshop Proceedings, 2008, pp. 62-67, IEEE; 6 pages.
Ahmed, Ahmed Mohamed Abdelsalam and Ian Marsland, "Co-channel Interference Cancellation in Wireless Cellular Networks", 2008, pp. 698-702, IEEE; 5 pages.
"Tutorial 1890: An Introduction to Spread-Spectrum Communications", Maximintegrated.com, Feb. 18, 2003, Maxim Integrated Products; 12 pages.
Patel, Pulin and Jack Holtzman, "Analysis of a Simple Successive Interference Cancellation Scheme in a DS/CDMA System", IEEE Journal on Selected Areas in Communications, Jun. 1994, pp. 796-807, vol. 12, No. 5, IEEE; 12 pages.
"Lecture 18: CDMA", Fall 2006; 10 pages.
"Channel Estimation", http://www.Mathworks.com/help/lte/ug/channel-estimation.html, accessed Feb. 4, 2014; 7 pages.
Dai, Huaiyu, Andreas F. Molish and H. Vincent Poor, "Downlink Multiuser Capacity for Interference-Limited MIMO Systems", IEEE PIMRC 2002, pp. 849-853, IEEE; 5 pages.
Dai, Huaiyu, Andreas F. Molisch and H. Vincent Poor, "Downlink Capacity of Interference-Limited MIMO Systems with Joint Detection", IEEE Transactions on Wireless Communications, Mar. 2004, pp. 442-453, vol. 3, No. 2, IEEE; 12 pages.
El-Osery, Aly and Chaouki Abdallah, "Power Control in CDMA Cellular Systems", EE Times, Nov. 28, 2001, UBM Electronics; 11 pages.
Brain, Marshall, Jeff Tyson, and Julia Layton, "How Cell Phones Work", Howstuffworks.com, accessed Feb. 4, 2014; 9 pages.
Mehmood, Asad and Waqas Aslam Cheema, "Channel Estimation for LTE Downlink", Thesis, Sep. 2009, Blekinge Institute of Technology; 89 pages.
Wang, Xiaodong and H. Vincent Poor, "Space-Time Multiuser Detection in Multipath CDMA Channels", IEEE Transactions on Signal Processing, Sep. 1999, pp. 2356-2374, vol. 47, No. 9, IEEE; 19 pages.
Honig, Michael and Michail K. Tsatsanis, "Adaptive Techniques for Multiuser CDMA Receivers: Enhanced Signal Processing with Short Spreading Codes", IEEE Signal Processing Magazine, May 2000, pp. 49-61, IEEE; 13 pages.
Shuping, Chen, et al., "Capacity Evaluation of Cellular TDD-CDMA Systems Deploying Multi-Frequency", IEEE International Symposium on Microwave, Antenna, Propagation, and EMC Technologies for Wireless Communications, 2007, pp. 119-124, IEEE; 6 pages.
Sil, Koushik, et al., "Performance of Turbo Decision-Feedback Detection for Downlink OFDM", IEEE WCNC Proceedings, 2007, pp. 1488-1492, IEEE; 5 pages.
Jinlong, et al., "Technical Requirements of Physical Layer for the CDMA-based Trunking Mobile Communication System", YD: Telecommunication Industry Standard, Nov. 5, 2008, Ministry of Industry and Information Technology, People's Republic of China; 400 pages.
"CDMA Reference Blockset", Cvut.cz, accessed Apr. 3, 2014, Chzech Technical University, Prague; 4 pages.
Garg, Mohit, "Multi-user Detection", Mumbai, India, Dec. 2004, 9 pages.
Blomer, Joseph and Nihar Jindal, "Transmission Capacity of Wireless Ad Hoc Networks: Successive Interference Cancellation vs. Joint Detection", IEEE International Conference on Communication, Jun. 14-18, 2009, IEEE; 5 pages.
Dai, Huaiyu and Andreas F. Molisch, "Multiuser Detection for Interference-Limited MIMO Systems", IEEE Vehicular Technology Conference, May 2002, IEEE; 5 pages.
Andrews, Jeffery G., "Chapter 2: Multiuser Detection", Successive Interference Cancellation for Uplink CDMA, Ph.D. Dissertation, Jun. 2002, pp. 16-26 and endnotes, Stanford University; 23 pages.
Wang, Shu, et al., "Toward Forward Link Interference Cancellation", CDG Technology Forum on Improving 3G Network Capacity, Coverage and Quality, Apr. 20, 2006, Burlingame, California; 27 pages.

* cited by examiner

MULTIUSER DETECTION FOR HIGH CAPACITY CELLULAR DOWNLINK

GOVERNMENT RIGHTS IN THE INVENTION

This invention was made with government support under grant number FA8721-05-C-0002 awarded by the Air Force. The government has certain rights in this invention.

FIELD OF THE INVENTION

The invention relates generally to cellular communication systems. More specifically, the invention relates to systems and methods for increasing the bandwidth of the cellular downlink.

BACKGROUND

Cellular communication data rates have been growing rapidly recently because of increasing demand from wireless internet and video streaming; however, available spectrum is saturated and new methods are needed to enhance throughput. More of the data rate demand has been on the downlink side, from the base stations to the user devices, than on the uplink side, from the user devices to the base stations. However, most research on multi-user detection (MUD) has focused on the uplink side in order to mitigate the near-far problem, where a nearby strong signal source can block a faraway weak signal source. In the downlink, techniques such as orthogonal frequency division multiplexing (OFDM), may offer high downlink bandwidth in a multipath environment, but do not work well in all cases, such as when the user is far away from a base station or when the user is at a cell boundary.

SUMMARY

All examples and features mentioned below can be combined in any technically possible way.

In one aspect, a method for decoding a transmission is provided. The method comprises receiving, by a user device, a downlink transmission containing a user signal intended for the user device and one or more interfering user signals directed to one or more other user devices. The user device obtains power stacking information including a power level for each of the user signals contained in the downlink transmission. The user device estimates a channel using pilot signals in the downlink transmission. The user device further demodulates and decodes each interfering user signal using the power stacking information and removes all interfering user signals from the received downlink transmission to obtain the user signal intended for the user device.

Embodiments of the method may include one of the following features, or any combination thereof.

The received downlink transmission may include the power stacking information, or the user device may be pre-configured with the power stacking information.

The received downlink transmission may include the power stacking information in a user signal having a highest power level of the user signals in the received downlink transmission, or a first portion of the power stacking information may be in a user signal having a highest power level of the user signals in the received downlink transmission and a remainder portion of the power stacking information may be in one or more of the other user signals in the received downlink transmission.

The power stacking information may include a relative phase, delay, modulation, and coding for each user signal. The power level of each user signal specified in the power stacking information may be relative to a reference power level.

Estimating the channel may further comprise using the power stacking information, accumulated remodulated data of at least one of the one or more interfering user signals, or a combination thereof, in addition to the pilot symbols to produce the channel estimation.

In addition, the method may further comprise reusing a channel estimate computed for a first user signal of the user signals in the received downlink transmission as the channel estimate for a second user signal of the user signals in the received downlink transmission having a lesser power level than the power level of the first user signal. Further, the method may further comprise combining multipath components of the received downlink transmission to increase a signal-to-noise ratio of the received downlink transmission, and reusing the combined multipath components computed for a first user signal of the user signals in the received downlink transmission as the combined multipath components for a second user signal of the user signals in the received downlink transmission having a lesser power level than the power level of the first user signal.

The method may further comprise accumulating re-modulated data of at least one of the one or more interfering user signals in memory, and using the accumulated re-modulated data to remove the interfering user signals one-by-one in succession from the received downlink transmission. Alternatively, the method may comprise accumulating re-modulated data of at least two interfering user signals in memory, and using the accumulated re-modulated data to remove the at least two interfering user signals combined from the received downlink transmission. Removing interfering user signals from the received downlink transmission may include using the power stacking information.

Additionally, the method may further comprise demodulating and decoding data of each interfering user signal in the received downlink transmission, re-coding and re-modulating the demodulated and decoded data of each interfering user signal, and accumulating the re-modulated data of each interfering user signal in memory. Error correction may be performed on demodulated and decoded data of each interfering user signal before re-coding and re-modulating the demodulated and decoded data of that interfering user signal.

In another aspect, a base station comprises a transmitter broadcasting a downlink signal containing user signals intended for a plurality of user devices. The transmitter includes power stacking information in the downlink signal. The power stacking information includes a power level for each of the user signals in the transmitted downlink signal.

Embodiments of the base station may include one of the following features, or any combination thereof. The transmitter may include the power stacking information in a user signal having a highest power level of the user signals in the downlink signal, or include a first portion of the power stacking information in a user signal having a highest power level of the user signals in the downlink signal and a remainder portion of the power stacking information in one or more of the other user signals in the received downlink signal.

The power stacking information may include a relative phase, delay, modulation, and coding for each user signal in the downlink signal. The power level of each user signal specified in the power stacking information may be relative to a reference power level.

In another aspect, a mobile device comprises a radio frequency (RF) receiver receiving a downlink transmission containing a user signal intended for the mobile device and one or more interfering user signals directed to one or more other user devices. A processor is programmed to obtain power stacking information including a power level for each of the user signals contained in the downlink transmission, to estimate a channel using pilot signals in the downlink transmission, to demodulate and decode each interfering user signal using the power stacking information, and to remove all interfering user signals together from the received downlink transmission to obtain the user signal intended for the user device.

Embodiments of the mobile device may include one of the following features, or any combination thereof.

The received downlink transmission may include the power stacking information. The mobile device may further comprise memory storing the power stacking information.

The processor may be further programmed to obtain the power stacking information from a user signal having a highest power level of the user signals in the received downlink transmission, or to obtain a first portion of the power stacking information from a user signal having a highest power level of the user signals in the received downlink transmission and a remainder portion of the power stacking information from one or more of the other user signals in the received downlink transmission.

The power stacking information may include a relative phase, delay, modulation, and coding for each user signal. The power level of each user signal specified in the power stacking information may be relative to a reference power level.

The processor may be further programmed to estimate the channel using the power stacking information, accumulated re-modulated data of at least one of the one or more interfering user signals, or a combination thereof, in addition to the pilot symbols to produce the channel estimation. The processor may be further programmed to reuse a channel estimate computed for a first user signal of the user signals in the received downlink transmission as the channel estimate for a second user signal of the user signals in the received downlink transmission having a lesser power level than the power level of the first user signal. Further, the processor may be programmed to combine multipath components of the received downlink transmission to increase a signal-to-noise ratio of the received downlink transmission and to reuse the combined multipath components computed for a first user signal of the user signals in the received downlink transmission as the combined multipath components for a second user signal of the user signals in the received downlink transmission having a lesser power level than the power level of the first user signal.

The processor may be further programmed to accumulate re-modulated data of at least one of the one or more interfering user signals in memory, and use the accumulated re-modulated data of the at least one of the one or more interfering user signals to remove the interfering user signals one-by-one in succession from the received downlink transmission. Alternatively, the processor may be programmed to accumulate re-modulated data of at least two interfering user signals in memory, and use the accumulated re-modulated data to remove the at least two interfering user signals combined from the received downlink transmission. The processor may use the power stacking information when removing interfering user signals from the received downlink transmission.

Also, the processor may be further programmed to demodulate and decode data of each interfering user signal in the received downlink transmission, to re-code and re-modulate the demodulated and decoded data of each interfering user signal, and to accumulate the re-modulated data of each interfering user signal in memory. Error correction may be performed on the demodulated and decoded data of each interfering user signal before re-coding and re-modulating the demodulated and decoded data of that interfering user signal.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
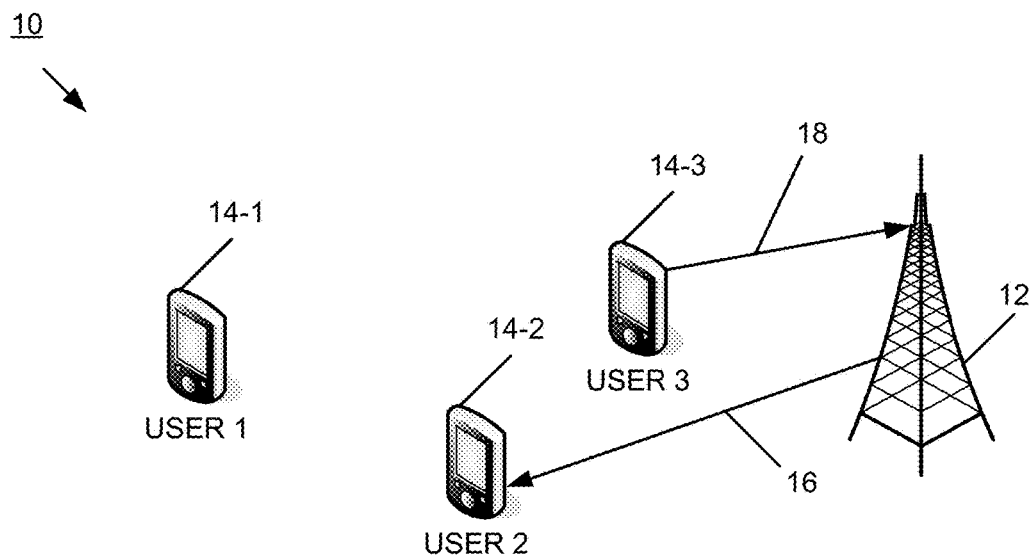
FIG. 1 is a diagram of an example of a cellular communication cell having multiple user devices in communication with a single base station.

Cellular communication systems employing the downlink multi-user detection (MUD) technology described herein can increase the cellular downlink data rate of the system over existing MUD techniques, especially near the cell boundaries, by efficiently mitigating self-interference. Self-interference consists of intra-cell (within the cell) interference and inter-cell interference (out-of-cell co-channel interference) often occurring at the cell boundaries. The expected increase in the downlink data rate derives from the ability of receivers (i.e., user devices) to more accurately estimate the multipath channel using all decoded users' signals and to remove interference signals more accurately than conventional downlink methods (e.g., orthogonal frequency-division multiplexing or OFDM). The improved accuracy of the channel estimate can lead to further advantages, such as a higher signal-to-noise ratio (SNR), a lower bit error rate, and the ability to stack more signals on the same frequency carrier, which can lead to an increase in the overall downlink communication data rate. User devices at cell boundaries, far from a base station, can continuously receive the highest power signals, without nullifying the ability of user devices near the base station to decode their own signals.

In brief overview, each user device that receives a downlink transmission from a base station has access to power stacking information associated with the various downlink user signals embodied within that downlink transmission. The user devices may already possess the power stacking information before the downlink transmission arrives, having been "preconfigured" with the power stacking information associated with all user devices that may receive the downlink transmission, the user devices may request and acquire the power stacking information (e.g., from a repository) in response to receiving the downlink transmission, or the downlink transmission, itself, from the base station may carry the power stacking information to the user devices.

In general, power-stacking information refers to certain information that enables a user device to estimate the multipath channel of a received downlink transmission based on one or more user signals having a higher power level than that of its own intended user signal. To this user device, each user signal with a higher power level than its own intended user signal is referred to herein as an "interfering signal." The power-stacking information includes a relative or actual power level, and may include one or more of a relative phase and delay, error correcting code, scrambling code, and data rate, for each user signal included in the received in the downlink transmission. The power levels in the power stacking information provide a basis for maintaining an order of cancellation for interfering user signals and for estimating amplitude of such interfering user signals. The user device can acquire none, some, or all of this power stacking information from the downlink transmission itself. For example, the downlink transmission can contain the exact or relative power level used by a given base station for each of the user signals, while the user device can obtain (e.g., be pre-configured) the other information needed to decode the interfering user signals from elsewhere. Further, if all user signals from the base station are aligned in delay and phase, the user device need not obtain delay and phase information for any interfering user signals, either from a downlink transmission or from elsewhere, because such information is the same as its own.

With access to this power-stacking information, a user device can use a multipath channel estimation to demodulate, decode, optionally error correct, and re-modulate the data in the interfering user signals. In turn, the user device can use the re-modulated data of all interfering user signals to further improve the channel estimation for use in decoding its own intended user signal. In addition, the user device can subtract all interfering user signals from the original downlink transmission in a single operation (rather than successively removing each interfering user signal), as described in more detail below. Alternatively, the user device may subtract each interfering user signal successively from the original downlink transmission, and then from each successive remainder signal. The user device may use the power-stacking information when performing any one of more of the operations of estimating the channel, demodulating and decoding a user signal, and subtracting one or more interfering user signals.

One embodiment described herein computes the channel estimate for fewer than all interfering user signals within a received downlink transmission. For example, a user device can compute the channel estimate for the interfering user signal with the highest power level, and then reuse this same channel estimate for interfering user signals with a lower power level than this highest power level, including its own intended user signal. As another example, the user device can compute the channel estimate for the interfering user signal with the highest power level, recompute the channel estimate for the interfering signal with the next highest power level, and then reuse the last computed channel estimate in the decoding of zero, one or more other interfering user signals with a lower power level, the intended signal, or both. This reuse of a channel estimate can reduce the computational complexity by avoiding calculation for every interfering user signal.

One embodiment described herein combines the multipath components of the received downlink transmission for fewer than all interfering user signals. In general, combining the multipath components of the downlink transmission maximizes the signal-to-noise (SNR) ratio of the downlink transmission. For example, when working to cancel the interfering user signal with the highest power level from the downlink transmission, a user device can combine the multipath components of the downlink transmission to maximize the signal, and then reuse this same combined multipath signal when cancelling other interfering user signals (i.e., those with a lower power level than the highest power level, but with a higher power level than that of the intended user signal) and when demodulating and decoding the intended user signal. This reuse of a combined multipath signal may be used in conjunction with the aforementioned technique for reusing an estimate of the multipath channel.

FIG. 1 shows an embodiment of a single cell 10 of a cellular communications network including a fixed base station 12 and a plurality of mobile or fixed user devices 14-1, 14-2, 14-N (generally, user device or user 14). The base station 12 includes a wireless radio transceiver (not shown) coupled to antennas for communicating with the user devices 14 and linking the user devices 14 to the cellular communications network. User devices 14 have a transmitter (not shown) and a rake receiver (not shown) for wirelessly communicating with the base station 12 over wireless communication links. A wireless communication link from the base station 12 to a user device 14 can be referred to as a downlink or forward channel 16; a wireless communication link from a user device 14 to the base station 12 can be referred to as an uplink 18 or reverse channel. Example embodiments of a user device 14 include, but are not limited to, smartphones, handsets, wireless access points, fixed devices, such as desk top computers, and mobile devices, such as PDAs, smart tablets, and laptop computers.

In one embodiment, the cellular communications network is a Code Division Multiple Access (CDMA) network. CDMA is a spread-spectrum technique that uses spreading codes to differentiate communication channels such that multiple users can share simultaneously the same frequency spectrum. The spreading codes used by base station 12 to spread the data are independent for each user 14. Each receiver in a CDMA network has knowledge of its spreading code in order to demodulate and decode (i.e., decipher) the transmitted data in those signals received. Examples of CDMA technologies include cdmaOne, CDMA2000, Wideband CDMA (W-CDMA), and Direct Sequence CDMA (DS/CDMA).

For downlink communication to the user devices 14, the base station 12 uses several logical channels, including a pilot channel and a traffic channel used to carry data or speech. The pilot channel modulates a constant pilot symbol used for channel estimation. These pilot symbols enable coherent demodulation of the other logical channels carrying information, such as the traffic channel. The base station 12 also sends power control commands in, for example, a power control channel, to control the transmit power used by the user devices. In addition, the base station 12 can use a portion of the traffic channel (or a different designated "power stacking information" channel) to transmit power stack information to the user devices 14, as described herein.

By providing the power stacking information, the base station 12 provides the user devices 14 with the power levels of all user devices to which the base station 12 transmits signals, and potentially other information needed by a recipient user device to decode and remove interfering user signals, if any, in order to obtain its own intended user signal. The power stacking information can arrange the power levels within the designated power-stacking information channel in a particular order, from highest power level to lowest power level. These power levels can be expressed in relative terms; for example, the highest power level can be specified as 6 dB higher than the second highest power level, and the second highest power level being specified as 3 dB higher than the third highest power level, and so on. Alternatively, each relative power level can be specified relative to a common reference power level. Alternatively, the power levels for the user signals can be expressed within the power stacking information in the actual units of power (i.e., watts) used to transmit the individual user signals (e.g. 3 W, 1.4 W, 1 W).

For instance, in the example shown, the user 14-1 is the farthest of the users from the base station 12, the user 14-3 is the closest, and the user 14-2 is at an intermediate distance between the users 14-1, 14-3. Accordingly, the user 14-1 has the weakest reception of a signal from the base station 12, the user 14-3 has the strongest reception, and the reception of the user 14-2 is intermediate that of the users 14-1, 14-3. User 14-1 can represent a user at a cell boundary, who needs power to receive a decodable signal. Because the user 14-1 has the weakest reception, its signal from the base station 12 has the most power; whereas the signal from the base station 12 to the user 14-3 has the least power. The power of the signal transmitted from the base station 12 to the user 14-2 is less than that of the signal to the user 14-1, and greater than that of the signal to the user 14-3. These relative power levels produce a communication condition where the downlink user signal for user 14-1 interferes with the downlink user signals intended for user 14-2 and user 14-3, and the downlink user signal for user 14-2 interferes with that intended for the user 14-3.

Although described with respect to a base station and mobile user devices, the principles described herein can also extend to satellite communications. For example, a satellite can form a different transmit beam to each cell area, with each transform beam conveying the power stacking information of the users in that cell. As another example, the principles can extend to wireless local area networks (WLAN). For example, a Wi-Fi access point in wireless communication with a plurality of mobile or fixed user devices, such as laptops, desktop computers, smartphones, smart tablets, and peripheral devices, can transmit power stacking information to each user device on the WLAN.

Figure 2:
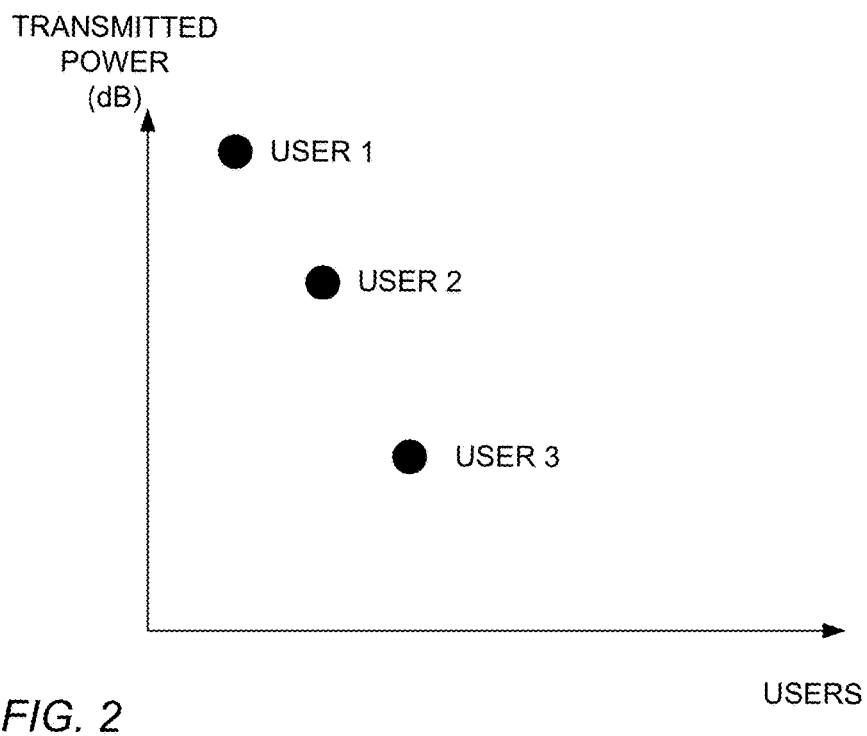
FIG. 2 is a graph of an example of a power stack representing a ranking of the power levels used by the single base station to transmit signals to the various user devices.

FIG. 2 graphically illustrates the relative power levels the signals transmitted from the base station 12 to the user devices 14 of FIG. 1. The downlink user signal for user 14-1 has the most power (in dB) of the user signals in the downlink transmission from the base station 12; downlink user signal for user 14-2 has the next highest power level; and the downlink user signal for user 14-3 has the least power. The graphic illustration of FIG. 2 corresponds to a power stack (i.e., a stack of power levels, from the highest power, user 14-1, to the lowest power, user 14-3).

When sending power stacking information to the users 14 in a downlink transmission, the base station 12 can include this information in a subset of its user signals. For example, the base station 12 can include all of the power stacking information in the user signal with the highest power level (in this example, user 14-1). Alternatively, the base station 12 can divide the power stacking information across multiple user signals, for example, a first portion of the power stacking information can be included in the user signal with the highest power level and the remainder of the power stacking information can be included in the user signal with the next highest power level.

Transmitting the power stacking information does not require many bits of the designated power-stacking information channel. The bits can convey exact or relative values of the power level (in dB), phase, and delay used by the base station 12 to transmit data simultaneously to the user devices 14 (for relative values, a reference signal, such as the signal with the highest power level, can serve as the reference). In addition, delay and phase information do not need transmitting if all user signals from the base station 12 are aligned in delay and phase. Various standard data compression techniques can be used to reduce the number of bits used to carry the power stacking information. One technique uses lookup tables representing commonly used power stacking information. For example, suppose the base station 12 uses two bits to convey the following four power stacking possibilities to the mobile devices 14: 1.) Users spaced by 3 dB; 2.) Users spaced by 5 dB; 3.) Users spaced by 10 dB; and 4.) Users spaced by 20 dB. In addition, each user device 14 includes a processor (or modem chip) with sufficient processing capacity to extract the power-stacking information from a received wireless downlink transmission and use this power stacking information to cancel each interfering signal from the intended signal.

Figure 3:
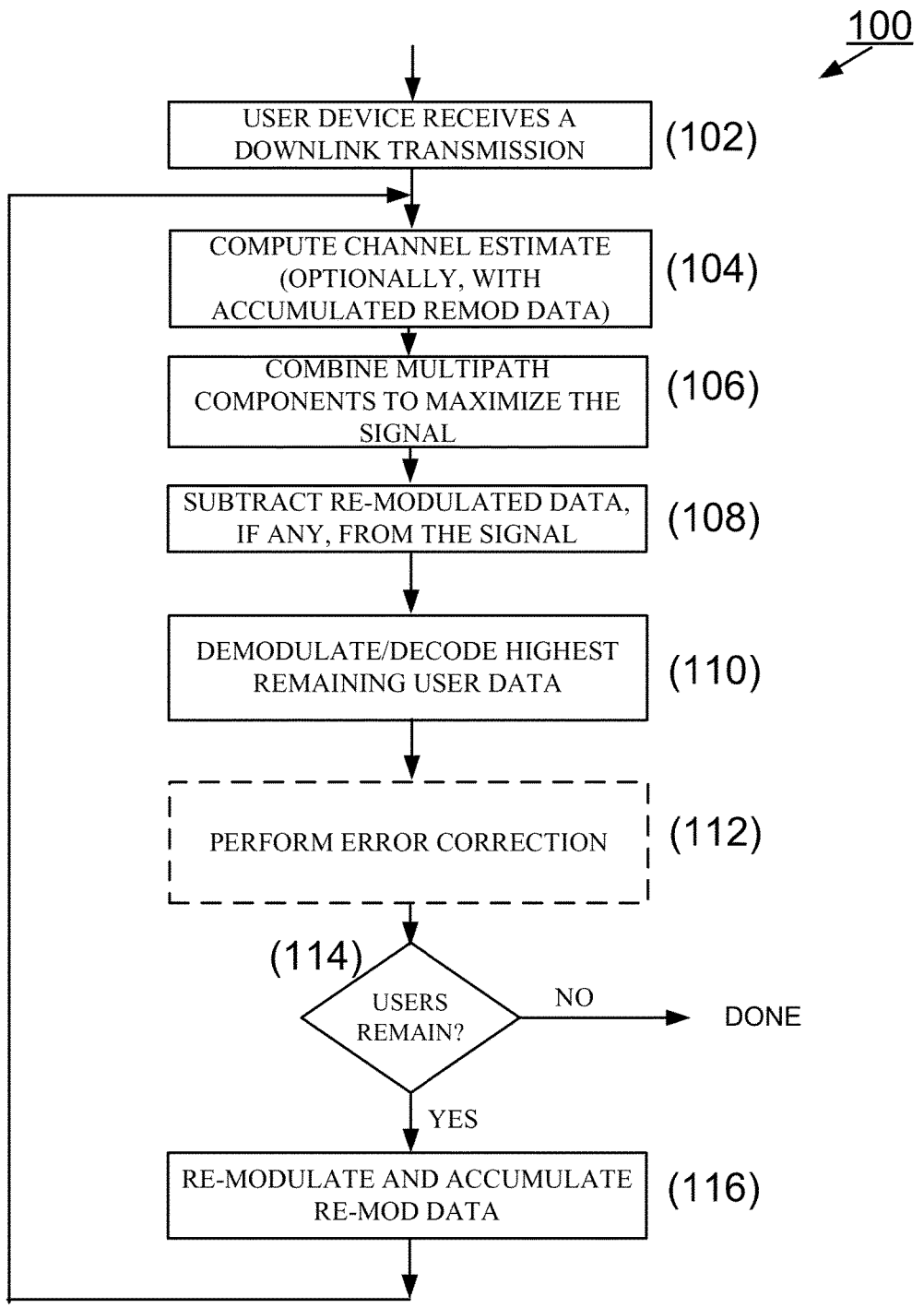
FIG. 3 is a flow diagram of an embodiment of a successive interference cancelation process.

FIG. 3 shows an embodiment of a process 100 of successive interference cancellation (SIC), performed concurrently by the user devices 14, to subtract each interfering signal from the original downlink transmission received from the base station 12, using power-stacking information associated with the users 14. The base station 12 may send this power-stacking information within a single user signal or spread the power-stacking information across multiple user signals. When the base station 12 transmits the power-stacking information within a single user signal, that user signal is the one at the highest transmit power level. Although described here with three user devices, the general operation of the SIC process 100 extends to numbers of users greater than three.

With the exception of the user signal having the highest power level, each of the other users 14 may use the power stacking information in the received downlink transmission to estimate the channel. Beginning with user 14-1, for illustration purposes only, this user device 14-1 receives (step 102) the downlink transmission from the base station 12. In this example, user 14-1 is farthest from the base station 12 and has a user signal with the highest power level. Thus, user 14-1 is responsible for receiving and decoding its own user signal only—interference cancellation of other user signals is unnecessary because such user signals are received at noise levels.

To acquire data from its received signal, the user 14-1 estimates (step 104) the multipath channel, typically, using the pilot signals in the downlink transmission, and then combines (step 106) the multipath delay components of the original downlink transmission to maximize the signal-to-noise (SNR) ratio. Because user 14-1 does not perform any interference cancelation, the process 100 skips the step 108 of subtracting modulated data of an interfering user signal from the downlink transmission. The user 14-1 then decodes (step 110) its user signal, for example, by using a matched filter with a corresponding scrambling code, performs error correction (step 112), and, there being no other user signals that remain to be processed, outputs (step 114) the error-corrected, decoded data.

With respect to user 14-2, the user device 14-2 also receives (step 102) the downlink transmission from the base station 12. The user signal within the downlink transmission intended for user 14-2 has a lower power level than the user signal intended for user 14-1. To obtain and decode its own intended signal, user 14-2 must first cancel the interfering user signal of user 14-1. Accordingly, the user 14-2 uses the pilot signals of this highest power level signal to user 14-1 to estimate (step 104) the channel. The user 14-2 then combines (step 106) the multipath delay components to maximize (i.e., to increase the SNR of) the downlink transmission, in particular, the user signal of user 14-1.

Because user 14-2 has not yet demodulated and decoded the interfering user signal of user 14-1, there is no re-modulated data to subtract from the maximally combined downlink transmission; and the process 100 skips the step 108 and proceeds to step 110. The user 14-2 demodulates and decodes (step 110) the data in the user signal of user 14-1, using the power stacking information to improve the accuracy of the demodulating and decoding. The user 14-2 can optionally perform (step 112) error correction on the demodulated data at this stage. If, at step 114, other user signals remain to be processed in the received downlink transmission, such as, in this instance, its own intended user signal, the user 14-2 recodes and re-modulates (step 116) the demodulated data of the user signal to user 14-1. Also in step 116, the re-modulated data is accumulated, that is, stored in memory for subsequent use.

The process 100 then returns to step 104 to recompute the channel estimate for the original downlink transmission. During this next iteration, the user 14-2 uses the original received downlink transmission and all presently accumulated re-modulated data, including the pilot signals, when estimating (step 104) the channel. More specifically, user 14-2 re-estimates the channel using the accumulated re-modulated data of user 14-1, which was recreated in step 116. This re-modulated data can produce a better channel estimate than using the pilot signals alone. The re-modulated data may also be used to improve the SNR of the pilot signals, which further improves the computation of the channel estimate. Similarly, the power stacking information may be used during the channel estimation, separately, or in combination with use of the re-modulated data.

In addition, the user 14-2 can improve the performance of signal cancellation (i.e., subtraction) by taking advantage of the power stacking information by the base station 12 in the transmitted signal. In conventional MUD, each subtraction requires estimating the channel, maximizing SNR while combining multipath components, and estimating the power level, phase, and delay of the subtraction signal. With the power stacking information being transmitted along with the data, the user 14-2 does not need to estimate the power level, phase, and delay; rather, such power stacking information expressly includes the power levels of all users, and, optionally, relative phase and delay. In one embodiment, the base station 12 aligns the phases and delays of all its transmitted signals, and, thus, foregoes having to include such information in the power stacking information.

This re-estimation of the channel may result in an improved combining of the multipath components (step 106) and higher signal-to-noise ratio (SNR) in the subtracted signal that still contains the signal of the user 14-2. After combining the multipath components, the user 14-2 subtracts (step 108) all re-modulated data (demodulated and decoded thus far) and pilot signals from the original downlink transmission, for example, by using a least squares fit algorithm, to acquire its own intended user signal. The user 14-2 can then decode (step 110) its own intended user signal from the remainder signal, for example, by matched filtering with its own scrambling code. After acquiring its own user signal, the user 14-2 performs (step 112) error correction. Because, at step 114, no other user signals remain to be decoded in the received original downlink transmission, the process 100 is done; the user device 14-2 outputs the data in its user signal, be they speech or text.

With respect to user 14-3, which, in this example corresponds to the user device closest to the base station 12, user 14-3 successively cancels the interference user signals of all user with a higher transmit power level than its own. In this simple example, the user 14-3 needs to subtract the interfering user signals of the user 14-1 and user 14-2 from the received downlink transmission before the user 14-3 can decode its own user signal.

At step 102, the user device 14-3 receives the downlink transmission from the base station 12, which includes the power stacking information. From the power stacking information the user 14-3 knows how many users are active, their respective power levels, their channel code, and relative phases. This information is used to simplify the following decoding and channel estimation update procedure. Without the channel stacking information from the base station 12, the receiver would have to estimate the parameters, which would lead to degraded performance. To obtain its own user signal, user 14-3 first subtracts the interfering user signal with the highest power level, namely, user 14-1, from the received downlink transmission. Using the pilot signals of the user signal of user 14-1, user 14-3 estimates (step 104) the channel. The user 14-3 then combines (step 106) the multipath delay components to maximize the downlink transmission, in particular, the user signal of user 14-1. At this stage there is no re-modulated data to subtract from the maximally combined downlink transmission because user 14-3 has not yet demodulated and decoded the interfering user signal of user 14-1. The process 100 skips step 108 and proceeds to step 110.

At step 110, user 14-3 computes demodulates and decodes (step 110) the data of the user 14-1 signal, and, optionally, performs (step 112) error correction. Because, at step 114, other user signals in the originally received signal remain to be decoded, such as, in this instance, the interfering user signal of user 14-2 and its own intended user signal, the user 14-3 recodes, re-modulates, and accumulates (step 116) the re-modulated data of user signal 14-1 and returns to step 104 to re-compute the channel estimate. The re-modulated data of user signal 14-1 is accumulated, that is, stored in memory for subsequent use during the next iteration of the process.

During the next iteration of the process 100, the user 14-3 decodes the interfering user signal of user 14-2. The user 14-3 uses the original received downlink transmission and all accumulated re-modulated data of user signal 14-1, including the pilot signals in the user signal 14-1, when estimating (step 104) the channel. After estimating the channel, user 14-3 combines (step 106) the multipath components of the downlink transmission to improve its SNR.

After maximizing the SNR of the downlink transmission, the user 14-3 subtracts (step 106) all re-modulated data (i.e., at this point in the process, the pilot signals and re-modulated data in the user signal to user 14-1) from the original received downlink transmission. The user 14-3 then decodes (step 110) the user signal with the highest power level in the remainder signal, which, in this example, is the user signal to user 14-2. After decoding the user signal 14-2, the user 14-3 can optionally perform (step 112) error correction. Because, at step 114, another user signal in the originally received downlink transmission remains to be decoded, namely, its own intended user signal, user 14-3 recodes, re-modulates, and accumulates (step 116) the re-modulated data of the user signal to user 14-2. At this stage, the memory stores the re-modulated data and pilot signals of the user signal to user 14-1 and the re-modulated data of the user signal to user 14-2. User 14-3 returns to step 104 to re-compute the channel estimate for the next iteration of the process.

During this next iteration, the user 14-3 uses the original received downlink transmission, the power stacking information, and all accumulated re-modulated data (and pilot signals) when re-estimating (step 104) the channel; this accumulated re-modulated data includes that of the user signal to user 14-1 and of the user signal to user 14-2. Again, the use of the re-modulated data of the interfering user signals to calculate the channel can improve the accuracy of the channel estimate, and again, re-estimating the channel may result in an improved combining of the multipath components and higher signal-to-noise ratio (SNR) in the downlink transmission.

Alternatively, instead of re-estimating the channel, the user 14-3 can advantageously reuse the previous channel estimation produced, which, in this example, is the channel estimate produced in connection with decoding the user signal of user 14-2. Reusing a previously computed channel estimation can have the advantage of reducing the computational throughput required when there are a large number of user devices and interfering user signals. Although theoretically not as precise as estimating the channel based on the channel estimations computed for all user signals, the subtraction of interfering signals is expected to be effective because the channel estimation produced from a small number of user signals with the highest power levels may be sufficient to a channel estimate for user signals of lower power level by using the power stacking information.

Reuse of a channel estimation can occur during any iteration of the process 100 after the decoding of the user signal with the highest power level. Accordingly, a reused channel estimate can be a channel estimate derived from the user signal of as few as a single user (i.e., the user signal with the highest power level), and may be based only on the pilot signals of that user signal, provided this reused channel estimate can provide sufficient SNR. Alternatively, a reused channel estimate can be a channel estimate derived from pilot signals and re-modulated data acquired from the user signals directed to multiple users.

After re-estimating the channel, or reusing a previously computed channel estimation, user 14-3 computes (step 106) the multipath to maximize the downlink transmission. Similar to reusing a previously computed channel estimation, user 14-3 can reuse a previous multipath computation instead of re-computing the multipath signal again. Accordingly, the multipath signal can be computed (and recomputed) for the one or more of user signals with the highest power levels, and the last multipath computation can be reused when decoding user signals of lower power.

The user 14-3 subtracts (step 108) all re-modulated data (thus far, corresponding to user signals to the user 14-1 and user 14-2) from the original received downlink transmission. The subtraction of all interfering signals simultaneously from the original downlink transmission is a departure from a conventional technique of successively removing interfering signals, one by one, first from the original signal, then from each subsequent remainder signal. (In an alternative embodiment, each interfering user signal may be subtracted one-by-one, in succession, from the original signal, and then from each subsequent remainder signal. In general, interfering user signals may be removed from the original signal, and subsequently from a remainder signal, one, two, or more interfering user signals at a time.) The user 14-3 then decodes (step 110) its own user signal from the remaining signal, for example, by matched filtering with its own scrambling code. After acquiring its own user signal, the user 14-3 performs (step 112) error correction. Because, at step 114, no other user signals are to be decoded in the originally received downlink transmission, the process is done; the user device 14-3 outputs the data carried by its signal, such as speech or text.

Figure 4:
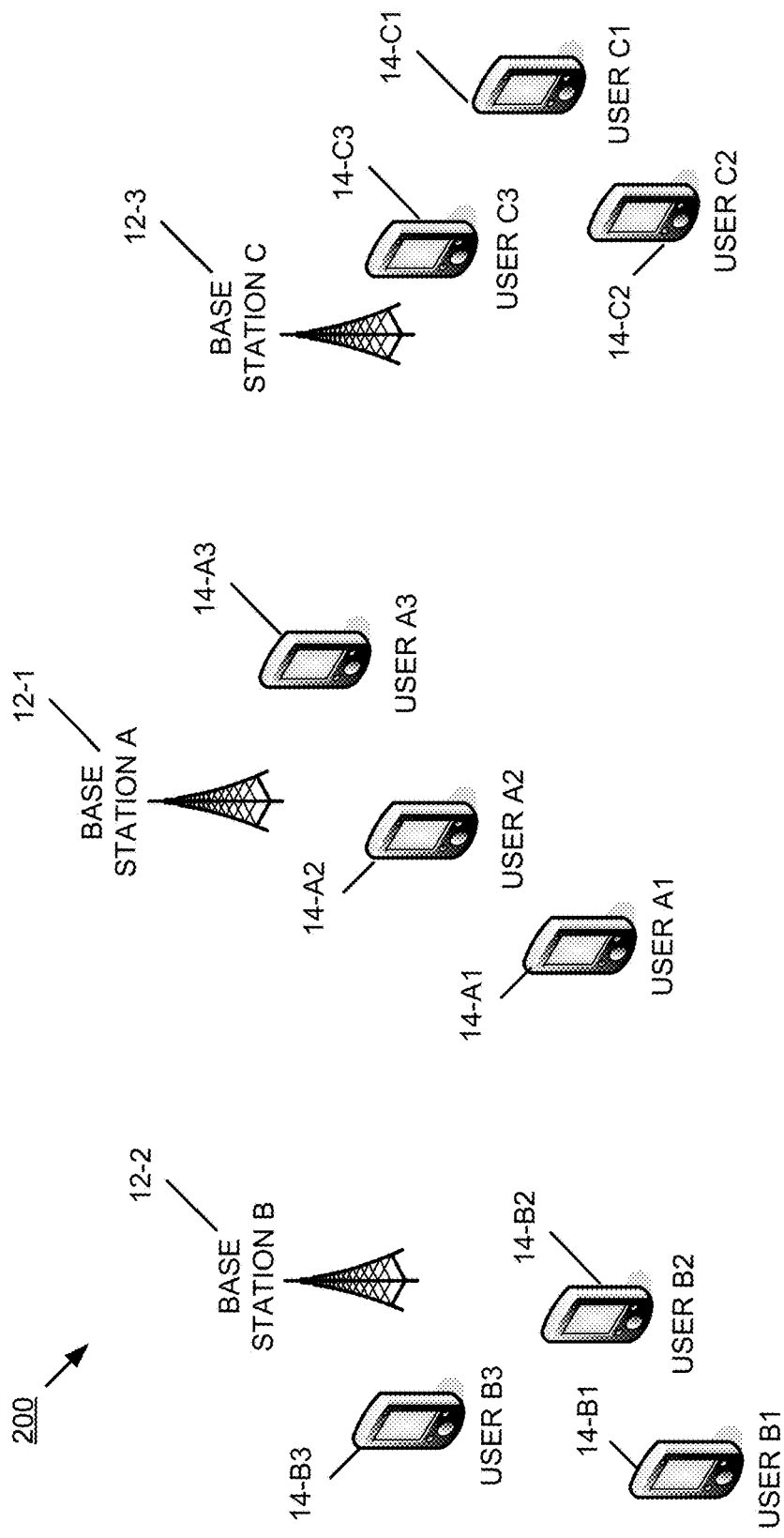
FIG. 4 is a diagram of an example of a cellular communication system having multiple base stations in communication with multiple user devices.

FIG. 4 shows an embodiment of a cellular communication network 200 having three base stations 12: base station (A) 12-1; base station (B) 12-2; and base station (C) 12-3. Each of the base stations 12-1, 12-2, and 12-3 transmits signals to its own user devices 14. For example, base station 12-1 transmits signals to user devices 14-A1, 14-A2, and 14-A3; base station 12-2 transmits signals to user devices 14-B1, 14-B2, and 14-B3; and base station 12-3 transmits signals to user devices 14-C1, 14-C2, and 14-C3. The user devices 14-A1, 14-A2, and 14-A3 need to decode their own user signals, but the user signals from the base station (B) 12-2 and base station (C) 12-3 are interfering with their reception.

Figure 5:
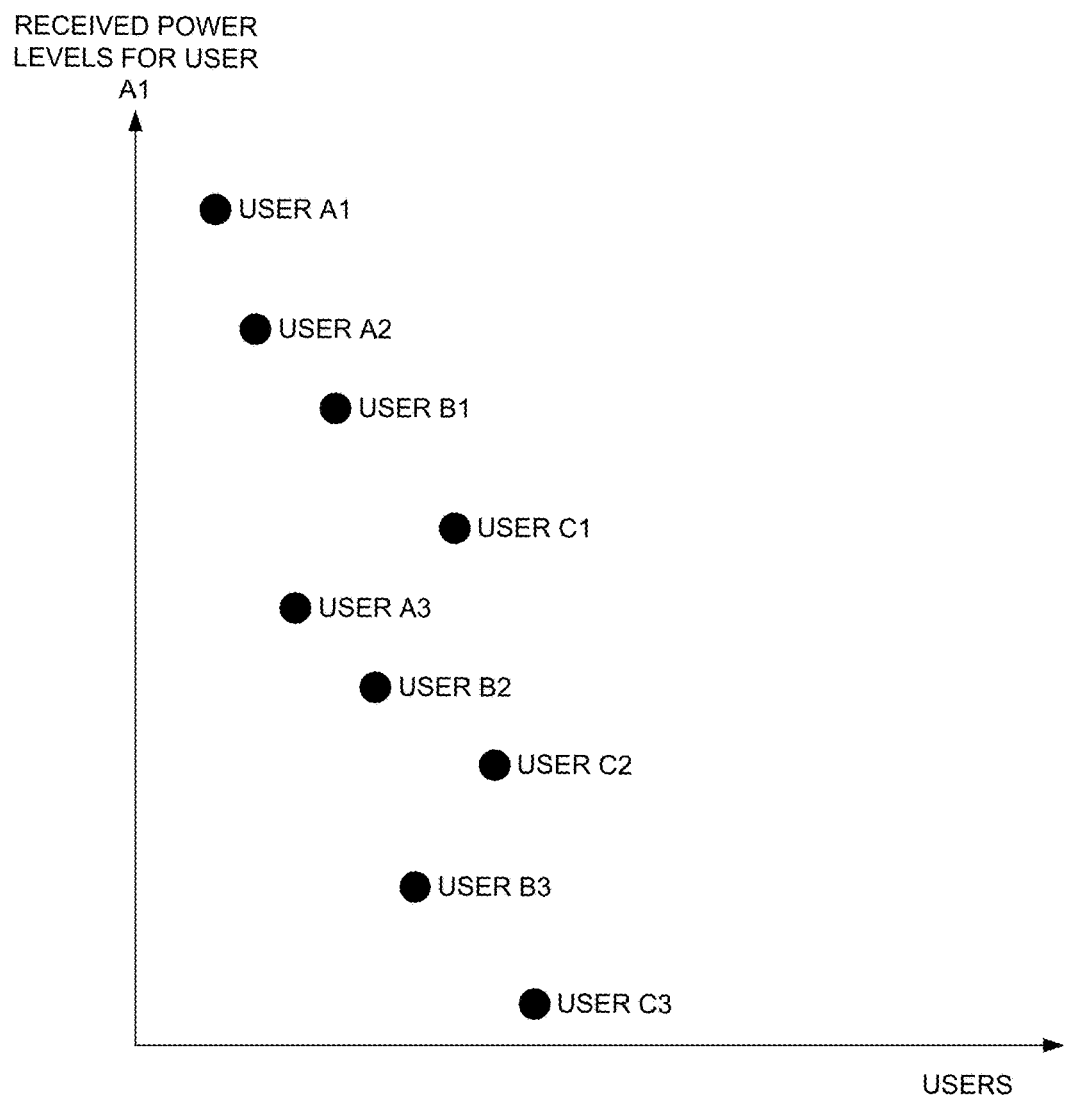
FIG. 5 is a graphical representation of a power stack representing a ranking of the power levels used by the base stations to transmit signals to the various user devices.

FIG. 5 shows an example power stack of the power levels of the user signals observed by, for example, the user 14-A3. In this example instance, the user 14-A3 needs to decode and subtract the signals for user devices 14-A1, 14-A2, 14-B1, and 14-C1, in this order, to maximize the SNR for its own user signal. Therefore, the user 14-A3 needs to estimate the channels for the base station (A) 12-1, base station (B) 12-2, and base station (C) 12-3, as the user 14-A3 performs interference cancellation.

In addition, each base station 12 transmits power stacking information in the signals directed to the users of that base station. For example, the power stacking information included in those signals sent by base station (B) 12-2 includes power level information for user devices 14-B1, 14-B2, and 14-B3; whereas the power stacking information included in those signals sent by base station (C) 12-3 includes power level information for user devices 14-C1, 14-C2, and 14-C3. The power stacking information transmitted by each base station 12 is relevant for user signals originating from that base station only. Power levels received by a user from a different base station than its own are considered unpredictable and need to be estimated. For example, the user 14-A3 can use the power stacking information from the base station (A) 12-1 to know precisely the power levels for user 14-A1 and user 14-A2, but cannot rely on the power stacking information received from base station (B) and base station (C) to know the power levels of user 14-B1 and user 14-C1. Accordingly, the user 14-A3 can use the process 100 described in connection with FIG. 3 to subtract the user signals directed to users 14-A1 and 14-A2, but needs to estimate the power levels for user 14-B1 and user 14-C1 during the subtraction using conventional techniques.

During the successive interference cancellation process, the user 14-A3 has an option to re-estimate the channel for each user signal being subtracted to get a high SNR, as described in connection with the process 100 in FIG. 3. In order to reduce computational complexity, while maintaining a relatively high SNR, the user 14-A3 can also estimate the channel using a small number of the highest power signals to estimate the channel for each base station 12 and to use the same channel estimate to subtract the lower power signals when the number of signals from each base station is large.

While the invention has been shown and described with reference to specific preferred embodiments, it should be understood by those skilled in the art that various changes in form and detail may be made therein without departing from the spirit and scope of the invention as defined by the following claims.

For example, to produce an even higher SNR, the channel estimation and subtraction method can account for nonlinearities in the base station transmitters. This technique involves estimating the nonlinearities and applying them to the subtracted signal in real time. The cellular communication can also utilize multiple parallel frequency bins for purposes of using parallel interference cancellation.

Some embodiments, for example, can have a different spreading factor and modulation for each user device 14. For those embodiments, the successive order for decoding may depend not only on the power level, but also on a combination of power level, spreading factor, and modulation. As another example, a single user can receive multiple signals at different power levels, to increase the downlink communication bandwidth.

In addition, there may be many different constellations used, such as BPSK, QPSK, and 16-QAM, etc. For example, the highest power level users may be using QPSK, while the lowest power level user could be using a 16-QAM constellation. Modulation schemes could include code-division multiple access via direct sequence, or OFDM, etc. For example, one modulation scheme can be multi-carrier with non-overlapping subcarriers, also known as filter-bank multicarrier modulation.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects. All such forms may be generally referred to herein as a "system." Furthermore, aspects of the present invention may take the form of a computer program product embodied in one or more computer readable storage medium(s) having computer readable program code embodied thereon.

A computer readable storage medium may be any tangible medium that can contain, or store a program for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. More specific examples of the computer readable storage medium include, but are not limited to, the following: a portable computer diskette, a hard disk, a random access memory (RAM), a read-only memory (ROM), an erasable programmable read-only memory (EEPROM, EPROM, Flash memory), an optical fiber, a portable compact disc read-only memory (CD-ROM), an optical storage device, a magnetic storage device, or any suitable combination of the foregoing. Program code embodied on a computer readable storage medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described herein with reference to flowchart illustrations and block diagrams of methods, apparatus (systems), and computer program products in accordance with embodiments of the invention. Each block of the flowchart illustrations and block diagrams, and combinations of blocks in the flowchart illustrations and block diagrams can be implemented by computer program instructions.

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions, acts, or operations specified in the flowchart and block diagram block. Computer program instructions may also be stored in a computer readable storage medium that can direct a computer, other programmable data processing apparatus, or other devices to function in a particular manner, such that the instructions stored in the computer readable medium produce an article of manufacture including instructions which implement the function, act, or operation specified in the flowchart and block diagram block.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions, acts, or operations specified in the flowchart or diagram block.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of program code, which comprises one or more executable instructions for implementing the specified logical function(s). The functions noted in the blocks may occur out of the order noted in the FIGS. For example, two blocks shown in succession may be executed substantially concurrently, or the blocks may sometimes be executed in the reverse order, depending upon the functionality involved. In addition, each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

What is claimed is:

1. A method for decoding a transmission, the method comprising:
  receiving, by a user device, a downlink transmission containing a user signal intended for the user device and one or more interfering user signals directed to one or more other user devices;

obtaining, by the user device, power stacking information including a power level for each of the user signals contained in the downlink transmission, wherein the received downlink transmission includes the power stacking information and the power stacking information expressly includes the power level for each of the user signals;

estimating, by the user device, a channel using pilot signals in the downlink transmission;

demodulating and decoding, by the user device, each interfering user signal contained in the downlink transmission using the power stacking information; and removing, by the user device, all interfering user signals from the received downlink transmission to obtain the user signal intended for the user device.

2. The method of claim 1, wherein the received downlink transmission includes the power stacking information in a user signal having a highest power level of the user signals in the received downlink transmission.

3. The method of claim 1, wherein the received downlink transmission includes a first portion of the power stacking information in a user signal having a highest power level of the user signals in the received downlink transmission and a remainder portion of the power stacking information in one or more of the other user signals in the received downlink transmission.

4. The method of claim 1, wherein the power stacking information further includes a relative phase, delay, modulation, and coding for each user signal in the downlink transmission.

5. The method of claim 1, wherein the power level of each user signal specified in the power stacking information is relative to a reference power level.

6. The method of claim 1, wherein the step of obtaining, by the user device, power stacking information includes pre-configuring the user device with the power stacking information.

7. The method of claim 1, wherein estimating a channel includes using the power stacking information and the pilot symbols to produce the channel estimation.

8. The method of claim 1, wherein estimating the channel includes using the pilot symbols, the power stacking information, and remodulated data from one or more interfering user signals to produce the channel estimation.

9. The method of claim 1, further comprising:
accumulating re-modulated data of at least one of the one or more interfering user signals in memory; and
wherein estimating the channel includes using the accumulated re-modulated data of at least one of the one or more interfering user signals to compute the channel estimation.

10. The method of claim 1, further comprising reusing a channel estimate computed for a first user signal of the user signals in the received downlink transmission as the channel estimate for a second user signal of the user signals in the received downlink transmission having a lesser power level than the power level of the first user signal.

11. The method of claim 1, further comprising accumulating re-modulated data of at least two interfering user signals in memory; and wherein removing, by the user device, all interfering user signals from the received downlink transmission includes using the accumulated re-modulated data to remove the at least two interfering user signals combined from the received downlink transmission.

12. The method of claim 1, further comprising accumulating re-modulated data of at least one of the one or more interfering user signals in memory; and wherein removing, by the user device, all interfering user signals from the received downlink transmission includes using the accumulated re-modulated data to remove the interfering user signals one-by-one in succession from the received downlink transmission.

13. The method of claim 1, wherein removing, by the user device, all interfering user signals from the received downlink transmission includes using the power stacking information when removing each of the interfering user signals from the downlink transmission.

14. The method of claim 1, further comprising:
combining multipath components of the received downlink transmission to increase a signal-to-noise ratio of the received downlink transmission; and
reusing the combined multipath components computed for a first user signal of the user signals in the received downlink transmission as the combined multipath components for a second user signal of the user signals in the received downlink transmission having a lesser power level than the power level of the first user signal.

15. The method of claim 1, further comprising performing error correction on demodulated and decoded data of each interfering user signal before re-coding and re-modulating the demodulated and decoded data of that interfering user signal.

16. A base station comprising:
a transmitter broadcasting a downlink signal containing user signals intended for a plurality of user devices, the transmitter transmitting power stacking information in the downlink signal, the power stacking information expressly including a power level for each of the user signals in the transmitted downlink signal.

17. The base station of claim 16, wherein the transmitter includes the power stacking information in a user signal having a highest power level of the user signals in the downlink signal.

18. The base station of claim 16, wherein the transmitter includes a first portion of the power stacking information in a user signal having a highest power level of the user signals in the downlink signal and a remainder portion of the power stacking information in one or more of the other user signals in the received downlink signal.

19. The base station of claim 16, wherein the power stacking information includes a relative phase, delay, modulation, and coding for each user signal in the downlink signal.

20. The base station of claim 16, wherein the power level of each user signal specified in the power stacking information is relative to a reference power level.

21. A mobile device comprising:
a radio frequency (RF) receiver receiving a downlink transmission containing a user signal intended for the mobile device and one or more interfering user signals directed to one or more other user devices; and
a processor programmed to obtain power stacking information including a power level for each of the user signals contained in the downlink transmission wherein the received downlink transmission includes the power stacking information and the power stacking information expressly includes the power level for each of the user signals, to estimate a channel using pilot signals in the downlink transmission, to demodulate and decode each interfering user signal contained in the downlink transmission using the power stacking information, and to remove all interfering user signals from the received downlink transmission to obtain the user signal intended for the user device.

22. The mobile device of claim 21 further comprising memory storing the power stacking information.

23. The mobile device of claim 21, wherein the processor is further programmed to obtain the power stacking information from a user signal having a highest power level of the user signals in the received downlink transmission.

24. The mobile device of claim 21, wherein the processor is further programmed to obtain a first portion of the power stacking information from a user signal having a highest power level of the user signals in the received downlink transmission and a remainder portion of the power stacking information from one or more of the other user signals in the received downlink transmission.

25. The mobile device of claim 21, wherein the power stacking information includes a relative phase, delay, modulation, and coding for each user signal in the downlink transmission.

26. The mobile device of claim 21, wherein the power level of each user signal specified in the power stacking information is relative to a reference power level.

27. The mobile device of claim 21, wherein the processor is further programmed to estimate a channel using the power stacking information and the pilot symbols.

28. The mobile device of claim 21, wherein the processor is further programmed to estimate a channel using the pilot symbols, the power stacking information, and remodulated data from one or more interfering user signals.

29. The mobile device of claim 21, further comprising memory; and wherein the processor is further programmed to accumulate re-modulated data of at least one of the one or more interfering user signals in the memory, and to estimate the channel using the accumulated re-modulated data of at least one of the one or more interfering user signals.

30. The mobile device of claim 21, wherein the processor is further programmed to reuse a channel estimate computed for a first user signal of the user signals in the received downlink transmission as the channel estimate for a second user signal of the user signals in the received downlink transmission having a lesser power level than the power level of the first user signal.

31. The mobile device of claim 21, wherein the processor is further programmed to accumulate re-modulated data of at least two interfering user signals in memory and to use the accumulated re-modulated data to remove the at least two interfering user signals combined from the received downlink transmission.

32. The mobile device of claim 21, wherein the processor is further programmed to accumulate re-modulated data of at least one of the one or more interfering user signals in memory and to use the accumulated re-modulated data to remove the interfering user signals one-by-one in succession from the received downlink transmission.

33. The mobile device of claim 21, wherein the processor is further programmed to use the power stacking information when removing each of the interfering user signals from the downlink transmission.

34. The mobile device of claim 21, wherein the processor is further programmed to:
 combine multipath components of the received downlink transmission to increase a signal-to-noise ratio of the received downlink transmission; and
 reuse the combined multipath components computed for a first user signal of the user signals in the received downlink transmission as the combined multipath components for a second user signal of the user signals in the received downlink transmission having a lesser power level than the power level of the first user signal.

35. The mobile device of claim 21, wherein the processor is further programmed to perform error correction on demodulated and decoded data of each interfering user signal before re-coding and re-modulating the demodulated and decoded data of that interfering user signal.

36. The method of claim 1, wherein the power stacking information is received over a designated power stacking information channel and bits of the designated power stacking information channel convey exact values of the power levels of the user signals.

37. The method of claim 1, wherein the power stacking information is received over a designated power stacking information channel and bits of the designated power stacking information channel convey relative values of the power levels of the user signals.

\* \* \* \* \*